United States Patent
Abdelmoneum et al.

(10) Patent No.: US 9,620,983 B2
(45) Date of Patent: Apr. 11, 2017

(54) ULTRASONIC UNIVERSAL WIRELESS CHARGING

(71) Applicants: Mohamed A. Abdelmoneum, Portland, OR (US); Paul J. Gwin, Orangevale, CA (US); Rashed Mahameed, Beaverton, OR (US); Mark E. Sprenger, Folsom, CA (US)

(72) Inventors: Mohamed A. Abdelmoneum, Portland, OR (US); Paul J. Gwin, Orangevale, CA (US); Rashed Mahameed, Beaverton, OR (US); Mark E. Sprenger, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 14/042,820

(22) Filed: Oct. 1, 2013

(65) Prior Publication Data
US 2015/0091498 A1 Apr. 2, 2015

(51) Int. Cl.
| | |
|---|---|
| H02J 7/00 | (2006.01) |
| H02J 17/00 | (2006.01) |
| H04B 11/00 | (2006.01) |
| H02J 7/02 | (2016.01) |
| H02J 50/00 | (2016.01) |
| H02J 50/15 | (2016.01) |
| H02J 50/90 | (2016.01) |

(52) U.S. Cl.
CPC ............ *H02J 7/025* (2013.01); *H02J 17/00* (2013.01); *H02J 50/00* (2016.02); *H02J 50/15* (2016.02); *H02J 50/90* (2016.02)

(58) Field of Classification Search
CPC ................................ H02J 7/025; H02J 50/00
USPC .......................................................... 320/108
See application file for complete search history.

(56) References Cited

U.S. PATENT DOCUMENTS 3,999,372 A * 12/1976 Welch ................... G07F 17/246
194/225
4,102,203 A * 7/1978 Sylvester .................. B63B 9/00
348/E7.086

(Continued)

FOREIGN PATENT DOCUMENTS

JP 2009072652 A 4/2009

OTHER PUBLICATIONS

International Search Report and Written Opinion for International Patent Application No. PCT/US2014/057583, mailed Dec. 23, 2014, 12 pages.

(Continued)

*Primary Examiner* — Samuel Berhanu
*Assistant Examiner* — Tarikh Rankine
(74) *Attorney, Agent, or Firm* — Jordan IP Law, LLC

(57) ABSTRACT

Methods and systems may provide for detecting a location of an adjacent ultrasonic receiver of a battery powered device relative to a charging surface of a contactless charger. The charging surface may include an ultrasonic array of transmitter sub arrays, wherein one or more of the transmitter sub arrays may be selectively activated based on the location to focus an ultrasonic beam on the adjacent ultrasonic receiver. In one example, a movement of the adjacent ultrasonic receiver may be detected and the focus of the ultrasonic beam is adjusted in response to the movement.

21 Claims, 4 Drawing Sheets

(56) References Cited

U.S. PATENT DOCUMENTS

| | | | | |
|---|---|---|---|---|
| 4,672,851 | A * | 6/1987 | Blessing | G01N 29/075 73/597 |
| 4,733,969 | A * | 3/1988 | Case | G01B 11/007 356/3.08 |
| 4,825,116 | A * | 4/1989 | Itoh et al. | 310/335 |
| 5,189,393 | A * | 2/1993 | Hu | 340/522 |
| 5,539,705 | A * | 7/1996 | Akerman | H04B 11/00 367/132 |
| 6,122,222 | A * | 9/2000 | Hossack et al. | 367/7 |
| 8,770,030 | B2 * | 7/2014 | Huffman et al. | 73/627 |
| 2002/0089305 | A1 * | 7/2002 | Park et al. | 320/108 |
| 2004/0130442 | A1 * | 7/2004 | Breed | B60C 11/24 340/443 |
| 2006/0238365 | A1 * | 10/2006 | Vecchione et al. | 340/657 |
| 2008/0094254 | A1 * | 4/2008 | Hill | B60Q 5/00 340/944 |
| 2008/0258679 | A1 * | 10/2008 | Manico | H02J 7/025 320/106 |
| 2010/0039271 | A1 * | 2/2010 | Izikoff | G01M 3/24 340/605 |
| 2010/0164433 | A1 * | 7/2010 | Janefalkar et al. | 320/115 |
| 2011/0285349 | A1 * | 11/2011 | Widmer | B60L 11/182 320/108 |
| 2012/0130511 | A1 * | 5/2012 | Null et al. | 700/79 |
| 2012/0155220 | A1 | 6/2012 | Lee et al. | |
| 2012/0157019 | A1 | 6/2012 | Li | |
| 2012/0299540 | A1 * | 11/2012 | Perry | 320/108 |
| 2012/0299542 | A1 | 11/2012 | Perry | |
| 2012/0313577 | A1 * | 12/2012 | Moes | H04B 5/0037 320/108 |
| 2013/0241468 | A1 * | 9/2013 | Moshfeghi | 320/107 |
| 2013/0271088 | A1 * | 10/2013 | Hwang et al. | 320/155 |

OTHER PUBLICATIONS

International Preliminary Report on Patentability for International Patent Application No. PCT/US2014/057583, mailed Apr. 14, 2016, 9 pages.

* cited by examiner

ULTRASONIC UNIVERSAL WIRELESS CHARGING

BACKGROUND

Technical Field

Embodiments generally relate to the charging of battery powered devices. More particularly, embodiments relate to the use of focused ultrasonic beams to charge battery powered devices.

Discussion

As battery powered devices such as notebook computers, tablet computers and smart phones may increase in popularity, challenges may in turn be encountered with regard to the charging of those devices. In particular, traditional contact-based chargers may differ from device to device, which may lead to end users carrying multiple different chargers and potentially struggling to identify the correct charger for a particular device. While contactless chargers such as capacitive or inductive chargers may be suitable in certain circumstances, there remains considerable room for improvement. For example, capacitive chargers may have poor efficiency and require special materials such as a metal chassis, whereas inductive chargers may cause electromagnetic interference (EMI) to surrounding devices. Moreover, recent developments in ultrasonic charging may have had limited commercial viability due to safety concerns.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
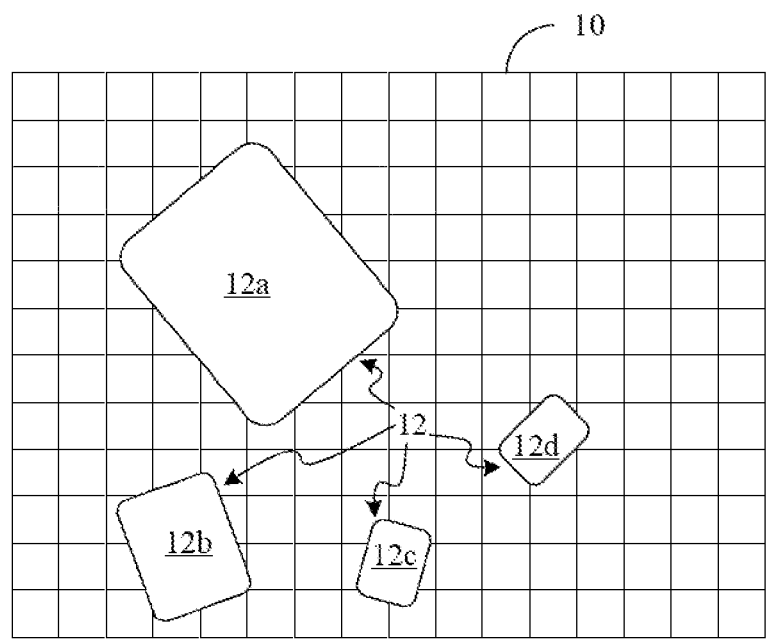
FIG. 1 is a plan view of an example of a plurality of battery powered devices on a contactless charging surface according to an embodiment.

FIG. 1 shows a charging surface 10 of a contactless charger upon which multiple battery operated devices 12 (12a-12d) may be placed in order to charge the internal batteries of the devices 12 without the use of a cable, plug, connector, and so forth. The illustrated charging surface 10 may be placed on a horizontal surface such as, for example, a desktop or table, although other non-horizontal configurations may also be used. The devices 12 may vary in size and type, and may have different functions. For example, a first device 12a might be a convertible tablet, a second device 12b may be an electronic book (ebook) reader 12b, a third device 12c may be one type of smart phone, and a fourth device 12d might be another type of smart phone 12d. The illustrated charging surface 10 generally represents a universal wireless charging solution in that it accepts devices having different functions and/or manufacturers and does not require the devices 12 to be plugged into or otherwise connected to the surface 10 in order for them to be charged. As will be discussed in greater detail, the charging surface 10 may use ultrasonic energy to charge the devices.

Figure 2:
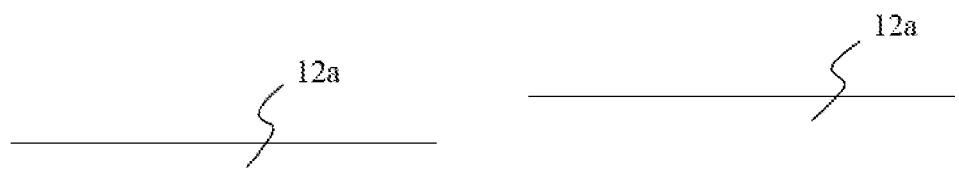
FIG. 2 is a side view of an example of an interface between a battery powered device and a contactless charging surface according to an embodiment.
Figure 2:
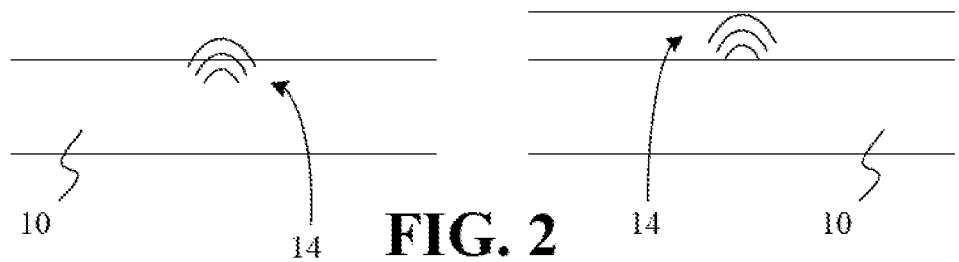

With continuing reference to FIGS. 1 and 2, the illustrated charging surface 10 includes an ultrasonic grid/array that is able to automatically determine the positioning of each of the devices 12 and focus an ultrasonic beam directly on an ultrasonic receiver (e.g., beam collector, not shown) of the devices 12. For example, FIG. 2 demonstrates that the charging surface 10 may focus an ultrasonic beam 14 on a specific location of the surface of the device 12a while the device 12a rests on the charging surface 10 as well as when the device 12a is separated from the charging surface 10 by an air gap (e.g., prior to initial placement, during movement/repositioning, initially after removal).

Figure 3:
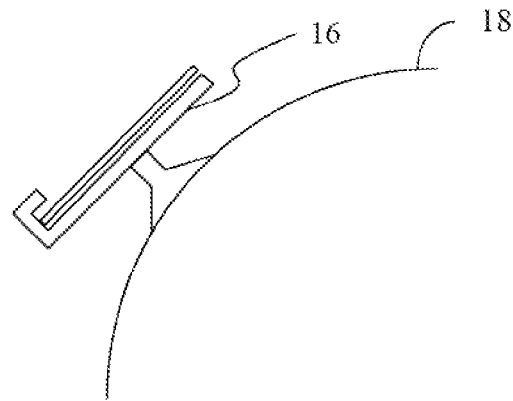
FIG. 3 is a side view of an example of a contactless charging mount according to an embodiment.

Because the illustrated charging surface 10 is able to automatically determine the positioning of the devices 12, users of the devices 12 may easily place the devices 12 on the charging surface 10 without regard to their orientation or location and be assured that the devices will be charged. Moreover, safety concerns over human exposure to the ultrasonic beam 14 may be obviated due to the focused nature of the beam 14 and the ability of the charging surface 10 to track the positions of the illustrated devices 12. FIG. 3 demonstrates that the charging surface may be incorporated into other structures such as a mount 16 that is coupled to a non-horizontal surface and/or object such as a vehicle dashboard 18.

Figure 4:
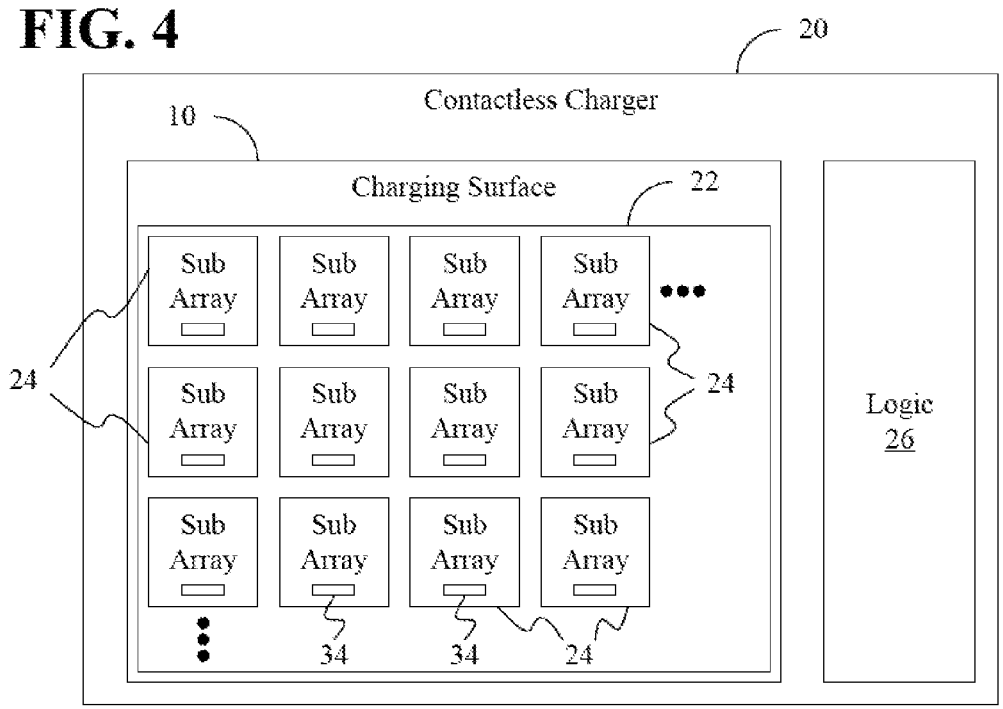
FIG. 4 is a block diagram of an example of a contactless charger according to an embodiment.

Turning now to FIG. 4, a contactless charger 20 is shown in which a charging surface 10 includes an array 22 of transmitter sub arrays 24. Each transmitter sub array 24 may generally include a plurality of ultrasonic transmitters. As will be discussed in greater detail, one or more of the sub arrays 24 may include a light detector 34. The illustrated charger 20 also includes logic 26 configured to detect the locations of adjacent ultrasonic receivers of battery powered devices relative to the charging surface 10. The logic 26 may also selectively activate one or more of the transmitter sub arrays 24 to focus ultrasonic beams on the adjacent ultrasonic receivers. In particular, the logic 26 may activate only the transmitter sub arrays 24 that overlap with (e.g., are beneath) the adjacent ultrasonic receivers (e.g., beam collectors) of the battery powered devices.

Figure 5:
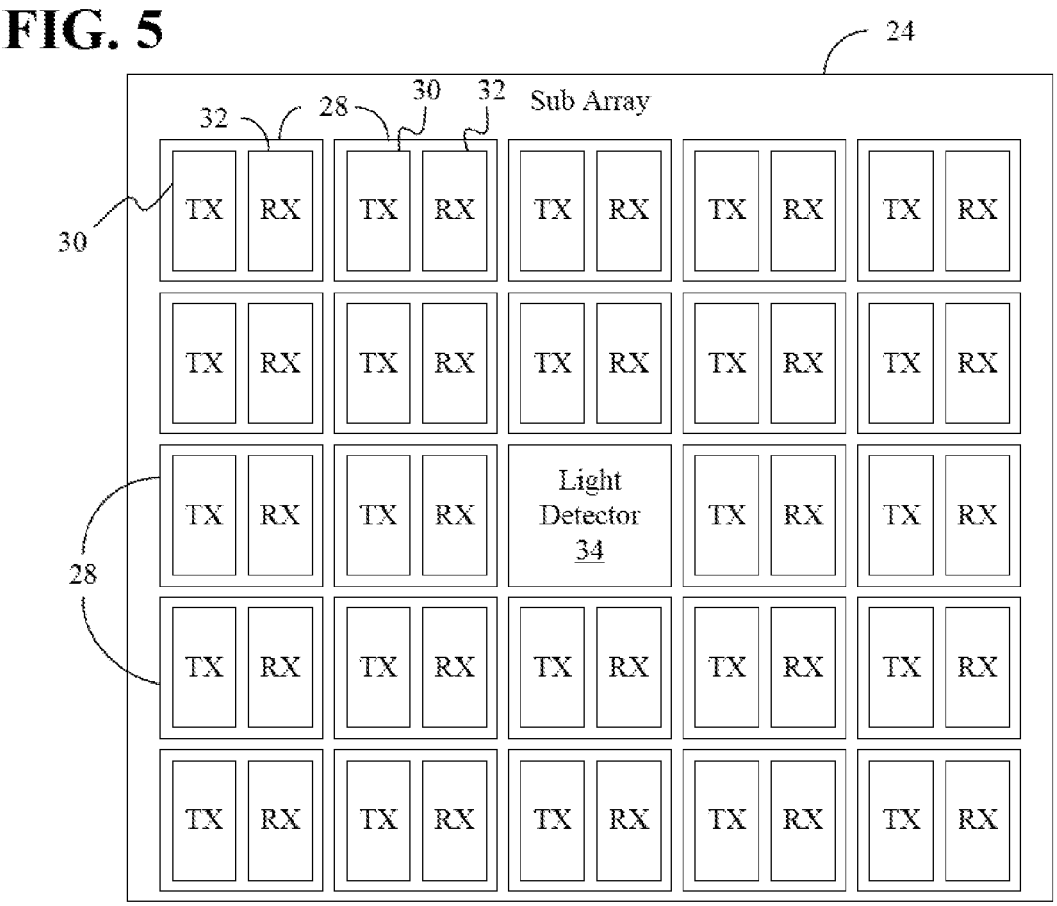
FIG. 5 is a block diagram of an example of a transmitter sub array according to an embodiment.

FIG. 5 shows a particular transmitter sub array 24 having a plurality of sub array components 28 with an ultrasonic transmitter (TX) 30 to output ultrasonic energy. The ultrasonic transmitters 30 may be microelectromechanical system (MEMS) based ultrasonic transducers such as, for example, capacitive micromachined ultrasonic transducers (CMUTs). The use of MEMS and/or CMUT technology may obviate any need for other special materials (e.g., metal chassis) in the contactless charger. One or more of the ultrasonic transmitters 30 may also have a corresponding ultrasonic receiver (RX) 32. As will be discussed in greater detail, the corresponding ultrasonic receivers 32 may also be able to capture ultrasonic energy reflected from nearby battery powered devices, wherein the captured ultrasonic energy may facilitate the tracking of those devices. The corresponding ultrasonic receivers 32 may also be fabricated using a MEMS based technology such as, for example, CMUT technology. The illustrated transmitter sub array 24 also includes a light detector 34 that may also be useful in tracking nearby battery powered devices as well as determining the charge level of those devices. The transmitter sub array 24 may also include one or more ultrasonic rangers (not shown) to facilitate in the tracking of devices.

Figure 6:
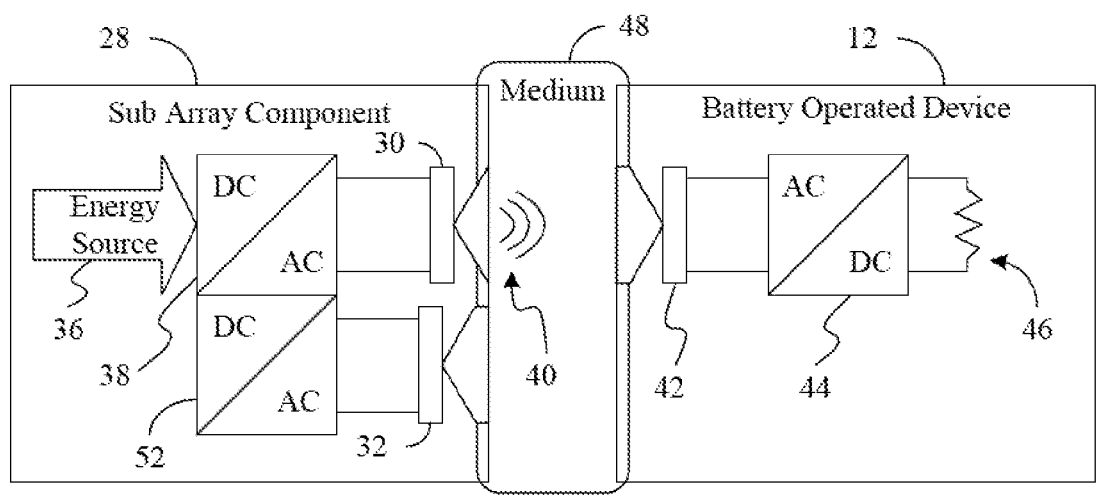
FIG. 6 is a block diagram of an example of an interface between a sub array component and a battery operated device according to an embodiment.

Turning now to FIG. 6, an interface between a sub array component 28 and a battery powered device 12 is shown. As already noted, the sub array component 28 may include an ultrasonic transmitter 30 that outputs ultrasonic energy 40 based on an input energy source signal 36 that is processed by a digital to analog (D/A) converter 38. The ultrasonic energy 40 may combine with the ultrasonic energy from several other sub array components to produce an ultrasonic beam such as the beam 14 (FIG. 2).

In the illustrated example, the battery operated device 12 includes an ultrasonic receiver 42 that is adjacent to the sub array component 28 and collects the ultrasonic energy 40 over a medium 48 (e.g., air). The illustrated ultrasonic receiver 42 also uses an analog to digital (A/D) converter 44 to drive a load 46 such as an internal power supply, battery and/or charger. The ultrasonic transmitter 30 and the adjacent ultrasonic receiver 42 may be impedance matched to achieve a relatively high efficiency over the medium 48 for the ultrasonic energy 40. The sub array component 28 may also include an ultrasonic receiver 32 corresponding to the ultrasonic transmitter 30 to capture ultrasonic energy reflected back from the battery operated device 12. In one example, the corresponding ultrasonic receiver 32 uses an A/D converter 52 to process the received ultrasonic energy.

The battery operated device 12 may also include an ultrasonic transmitter (not shown) that participates in a low power pulse and acknowledgement handshake with the sub array component 28. More particularly, the sub array component 28 may be used to generate a low power pulse to which the ultrasonic transmitter of the device 12 may reply by transmitting back a coded pulse acknowledging alignment. In such a case, only the sub array components 28 (or corresponding sub arrays) receiving the acknowledgement may be activated for ultrasonic beam generation.

Figure 7:
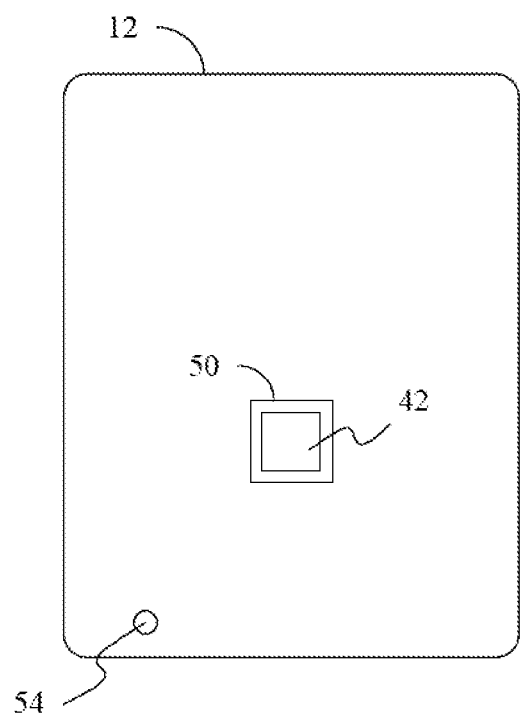
FIG. 7 is a rear view of an example of a battery powered device according to an embodiment.

FIG. 7 shows a battery powered device 12 having an ultrasonic receiver 42 positioned on an external surface of the housing of the device 12. In addition, a beam reflector 50 may be positioned at or around the perimeter of the ultrasonic receiver 42, wherein ultrasonic energy impacting the beam reflector 50 may be reflected back to a charging surface such as the charging surface 10 (FIGS. 1, 2 and 4) at a relatively high speed (e.g., faster than energy reflecting off of the housing). Accordingly, as the device 12 is moved over the contactless charger, the reflected ultrasonic energy from the beam reflector 50 may be used by the contactless charger to positively determine the position and orientation of the device 12 on the charging surface of the contactless charger. Knowledge of the wave pulse characteristics (e.g., frequency, wave speed) of the transmitted ultrasonic beam may also be taken into consideration when evaluating the reflected ultrasonic energy.

The device 12 may also have a charge light 54 disposed on the external surface of the housing, wherein one or more light detectors such as, for example, the light detector 34 (FIG. 5) on the adjacent charging surface may detect the charge light 54. In this regard, the charge level of the battery powered device 12 may be determined based on the status of the charge light (e.g., green is fully charged, red is charging, etc.), and the power of the ultrasonic beam may be adjusted (e.g., increased beam power to increase charge, decreased beam power to decrease charge, etc.) based on the charge state of the device 12. Although the illustrated ultrasonic receiver 42, beam reflector 50 and charge light 54 are disposed on the rear surface of the device 12, other configurations (e.g., front surface, side surface, etc., or combinations thereof) may be used depending upon the circumstances.

Figure 8:
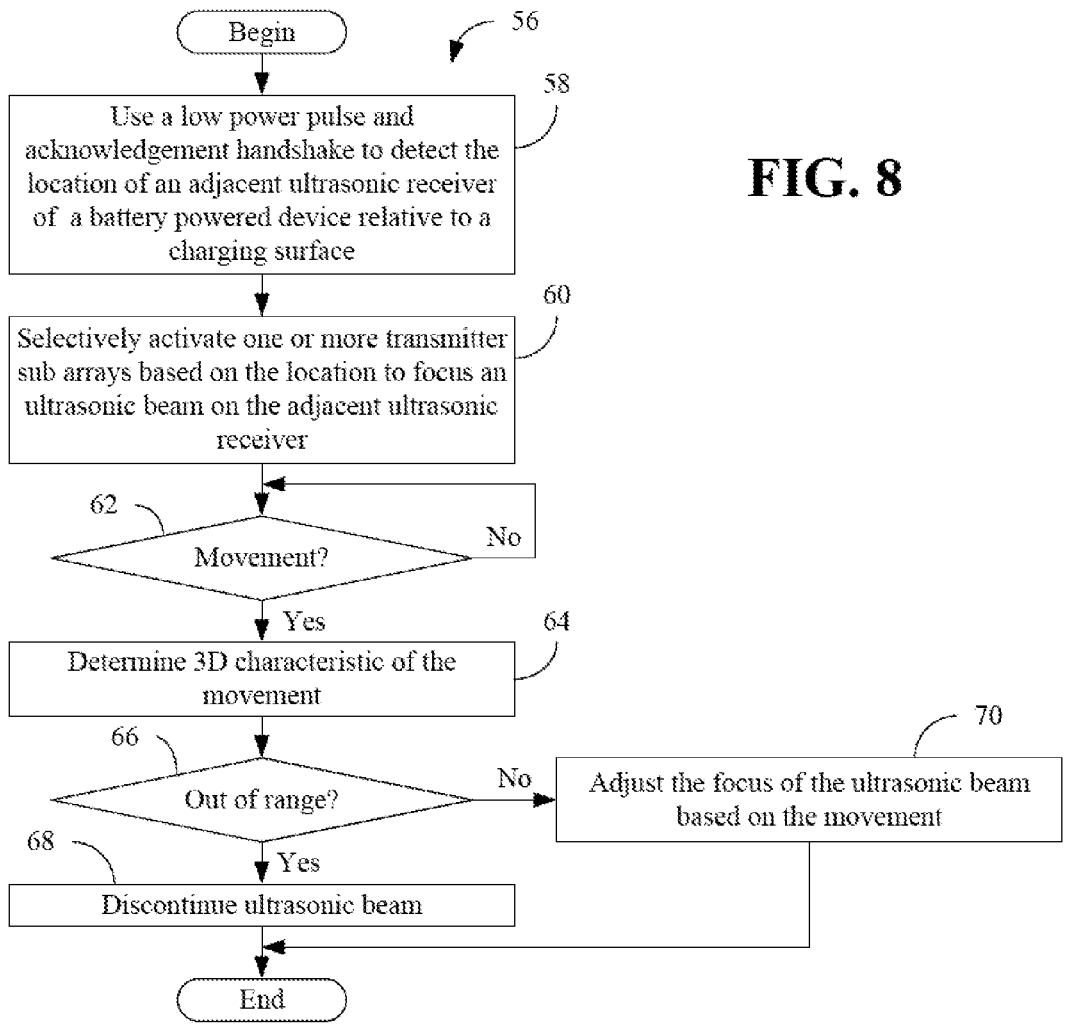
FIG. 8 is a flowchart of an example of a method of charging a battery operated device according to an embodiment.

FIG. 8 shows a method 56 of charging a battery. The method 56 may be implemented as a set of logic and/or firmware instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 56 may be written in any combination of one or more programming languages, including an object oriented programming language such as Java, Smalltalk, C++ or the like and conventional procedural programming languages, such as the "C" programming language or similar programming languages. In one example, the method 56 is implemented in the logic 26 (FIG. 4), already discussed.

Illustrated processing block 58 detects the location of an adjacent ultrasonic receiver of a battery powered device relative to a charging surface of a contactless charger. As already noted, the charging surface may include an ultrasonic array of transmitter sub arrays. In one example, block 58 uses a low power pulse and acknowledgement handshake to detect the location of the adjacent ultrasonic receiver. More particularly, the transmitter sub arrays may be used to generate a low power pulse to which the beam collector of the nearby device may reply by transmitting back a coded pulse acknowledging alignment.

One or more of the transmitter sub arrays (e.g., the sub arrays receiving an alignment acknowledgement) may be selectively activated at block 60 based on the location to focus an ultrasonic beam on the adjacent ultrasonic receiver. Block 62 may determine whether the device has moved. Block 62 may therefore involve receiving one or more signals from corresponding ultrasonic receivers on the transmitter sub arrays, and using the one or more signals to identify a differential in beam reflection energy with respect to a beam reflector positioned at the perimeter of the adjacent ultrasonic receiver. In such a case, a three-dimensional (3D, e.g., x-y-z) characteristic of the movement may be determined at block 64 based on the differential.

For example, the presence or lack of reflected ultrasonic energy at the various transmitter sub arrays may provide lateral location information (e.g., x-y) regarding the movement, whereas the strength and/or response time of the reflected ultrasonic energy may provide depth information (e.g., z) regarding the movement.

In another example, block 62 might involve receiving one or more signals from light detectors in the transmitter sub arrays and receiving one or more signals from ultrasonic rangers (e.g., grove detectors) in the transmitter sub arrays, wherein the 3D characteristic of the movement may be determined based on the signals from the light detectors and ultrasonic rangers. More particularly, the presence or lack of ambient light at the various transmitter sub arrays may provide lateral location information (e.g., x-y) regarding the movement, whereas the signals from the ultrasonic rangers may provide depth information (e.g., z) regarding the movement.

Block 66 may provide for determining whether an out of range condition is present. The out of range condition may generally be used to safeguard against human exposure to the ultrasonic energy. More particularly, if the battery powered device is moved far enough away from the charging surface, the out of range condition may be detected with regard to the movement. In one example, the transmitter sub arrays may be used to send a known wave pulse to the adjacent ultrasonic receiver, wherein one or more signals may be received from the corresponding ultrasonic receivers on the transmitter sub arrays. Additionally, one or more signals may be received from light detectors on the transmitter sub arrays. If either ambient light is detected at the light detectors or the response time of the reflected known pulse wave is long enough (e.g., a response time is exceeded), it may be determined that the out of range condition is present and block 68 may discontinue the ultrasonic beam. Otherwise, the focus of the ultrasonic beam is adjusted at illustrated block 70 based on the movement (e.g., the ultrasonic beam follows the device).

Figure 9:
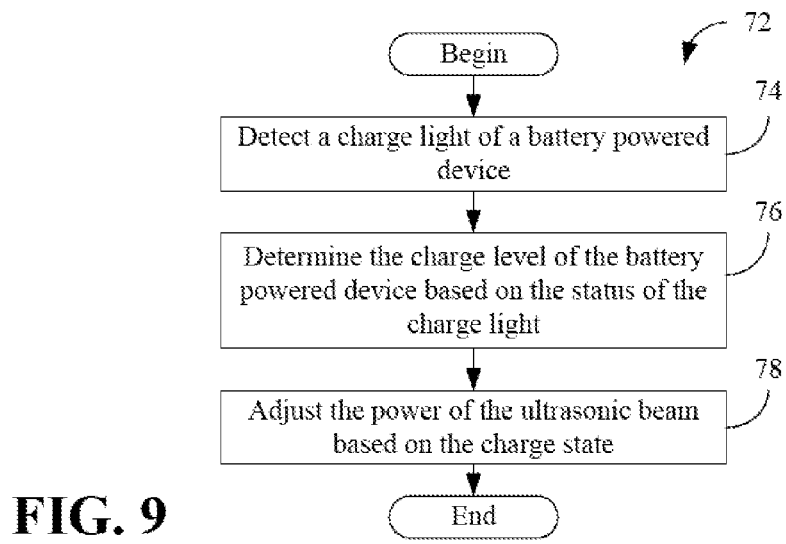
FIG. 9 is a flowchart of an example of a method of adapting an ultrasonic beam to a charge level of a battery operated device according to an embodiment.

FIG. 9 shows a method 72 of adapting an ultrasonic beam to a charge level of a battery powered device. The method 72 may be implemented as a set of logic and/or firmware instructions stored in a machine- or computer-readable storage medium such as RAM, ROM, PROM, flash memory, etc., in configurable logic such as, for example, PLAs, FPGAs, CPLDs, in fixed functionality logic hardware using circuit technology such as, for example, ASIC, CMOS or TTL technology, or any combination thereof. In one example, the method 72 is implemented in the logic 26 (FIG. 4), already discussed.

Illustrated processing block 74 provides for detecting a charge light of the battery powered device, wherein the charge light might be disposed on a rear external surface of the device. Detection of the charge light may involve leveraging information already known about the adjacent ultrasonic receiver of the device. For example, once a particular adjacent ultrasonic receiver is located, block 74 may use information from light detectors within a certain distance of that receiver (e.g., constrained by maximum device size information) to locate the charge light. Additionally, if multiple battery powered devices have been detected, block 74 might determine which charge light is closest to each adjacent ultrasonic receiver to identify the respective charge light. Other approaches may also be used. The charge level of the device may be determined at block 76 based on a status (e.g., color, wavelength) of the charge light, wherein the power of the ultrasonic beam is adjusted at block 78 based on the charge state.

ADDITIONAL NOTES AND EXAMPLES

Example 1 may include a contactless charger comprising a charging surface including an array of transmitter sub arrays, each transmitter sub array having a plurality of ultrasonic transmitters. The contactless charger may also comprise logic to detect a location of an adjacent ultrasonic receiver of a battery powered device relative to the charging surface, and selectively activate one or more of the transmitter sub arrays based on the location to focus an ultrasonic beam on the adjacent ultrasonic receiver.

Example 2 may include the contactless charger of Example 1, wherein the logic is to detect a movement of the adjacent ultrasonic receiver, and adjust the focus of the ultrasonic beam in response to the movement.

Example 3 may include the contactless charger of Example 2, wherein a plurality of the transmitter sub arrays have a corresponding ultrasonic receiver and the logic is to receive one or more signals from the corresponding ultrasonic receivers, use the one or more signals from the corresponding ultrasonic receivers to identify a differential in beam reflection energy with respect to a beam reflector positioned at a perimeter of the adjacent ultrasonic receiver, and determine a three-dimensional characteristic of the movement based on the differential.

Example 4 may include the contactless charger of Example 2, wherein a plurality of the transmitter sub arrays have a light detector and an ultrasonic ranger, and the logic is to receive one or more signals from the light detectors, receive one or more signals from the ultrasonic rangers, and determine a three-dimensional characteristic of the movement based on the one or more signals from the light detectors and the one or more signals from the ultrasonic rangers.

Example 5 may include the contactless charger of Example 2, wherein the logic is to detect an out of range condition associated with the movement, and discontinue the ultrasonic beam in response to the out of range condition.

Example 6 may include the contactless charger of Example 5, wherein a plurality of the transmitter sub arrays have a light detector and a corresponding ultrasonic receiver and the logic is to use the transmitter sub arrays to send a known wave pulse to the adjacent ultrasonic receiver, receive one or more signals from the light detectors, and receive one or more signals from the corresponding ultrasonic receivers, wherein the out of range condition is detected based on the one or more signals from the light detectors and the one or more signals from the corresponding ultrasonic receivers.

Example 7 may include the contactless charger of any one of Examples 1 to 6, wherein the charging surface further includes a light sensor, the logic to detect a charge light of the battery powered device, determine a charge level of the battery powered device based on a status of the charge light, and adjust a power of the ultrasonic beam based on the charge state of the battery powered device.

Example 8 may include a battery powered device comprising an ultrasonic receiver, a beam reflector positioned at a perimeter of the ultrasonic receiver and a charge circuit to transfer a charge signal from the ultrasonic receiver to a battery.

Example 9 may include the battery powered device of Example 8, further including a housing, wherein the beam reflector is coupled to an external surface of the housing.

Example 10 may include the battery powered device of Example 9, further including a charge light disposed on the external surface of the housing.

Example 11 may include a method of operating a contactless charger, comprising detecting a location of an adjacent ultrasonic receiver of a battery powered device relative to a charging surface of the contactless charger, the charging surface including an ultrasonic array of transmitter sub arrays. The method may also provide for selectively activating one or more of the transmitter sub arrays based on the location to focus an ultrasonic beam on the adjacent ultrasonic receiver.

Example 12 may include the method of Example 11, further including detecting a movement of the adjacent ultrasonic receiver; and adjusting the focus of the ultrasonic beam in response to the movement.

Example 13 may include the method of Example 12, wherein a plurality of the transmitter sub arrays have a corresponding ultrasonic receiver and the method further includes receiving one or more signals from the corresponding ultrasonic receivers, using the one or more signals from the corresponding ultrasonic receivers to identify a differential in beam reflection energy with respect to a beam reflector positioned at a perimeter of the adjacent ultrasonic receiver, and determining a three-dimensional characteristic of the movement based on the differential.

Example 14 may include the method of Example 12, wherein a plurality of the transmitter sub arrays have a light detector and an ultrasonic ranger, and the method further includes receiving one or more signals from the light detectors, receiving one or more signals from the ultrasonic rangers, and determining a three-dimensional characteristic of the movement based on the one or more signals from the light detectors and the one or more signals from the ultrasonic rangers.

Example 15 may include the method of Example 12, further including detecting an out of range condition associated with the movement, and discontinuing the ultrasonic beam in response to the out of range condition.

Example 16 may include the method of Example 15, wherein a plurality of the transmitter sub arrays have a light detector and a corresponding ultrasonic receiver and the method further includes using the transmitter sub arrays to send a known wave pulse to the adjacent ultrasonic receiver, receiving one or more signals from the light detectors, and receiving one or more signals from the corresponding ultrasonic receivers, wherein the out of range condition is detected based on the one or more signals from the light detectors and the one or more signals from the corresponding ultrasonic receivers.

Example 17 may include the method of any one of Examples 11 to 16, wherein the charging surface further includes a light sensor, the method further including detecting a charge light of the battery powered device, determining a charge level of the battery powered device based on a status of the charge light, and adjusting a power of the ultrasonic beam based on the charge state of the battery powered device.

Example 18 may include at least one computer readable storage medium comprising a set of instructions which, if executed by a contactless charger, cause the contactless charger to detect a location of an adjacent ultrasonic receiver of a battery powered device relative to a charging surface of the contactless charger, the charging surface to include an ultrasonic array of transmitter sub arrays. The instructions, if executed, may also cause the contactless charger to selectively activate one or more of the transmitter sub arrays based on the location to focus an ultrasonic beam on the adjacent ultrasonic receiver.

Example 19 may include the at least one computer readable storage medium of Example 18, wherein the instructions, if executed, cause the contactless charger to detect a movement of the adjacent ultrasonic receiver, and adjust the focus of the ultrasonic beam in response to the movement.

Example 20 may include the at least one computer readable storage medium of Example 19, wherein a plurality of the transmitter sub arrays have a corresponding ultrasonic receiver and the instructions, if executed, cause the contactless charger to receive one or more signals from the corresponding ultrasonic receivers, use the one or more signals from the corresponding ultrasonic receivers to identify a differential in beam reflection energy with respect to a beam reflector positioned at a perimeter of the adjacent ultrasonic receiver, and determine a three-dimensional characteristic of the movement based on the differential.

Example 21 may include the at least one computer readable storage medium of Example 19, wherein a plurality of the transmitter sub arrays have a light detector and an ultrasonic ranger, and the instructions, if executed, cause the contactless charger to receive one or more signals from the light detectors, receive one or more signals from the ultrasonic rangers, and determine a three-dimensional characteristic of the movement based on the one or more signals from the light detectors and the one or more signals from the ultrasonic rangers.

Example 22 may include the at least one computer readable storage medium of Example 19, wherein the instructions, if executed, cause the contactless charger to detect an out of range condition associated with the movement, and discontinue the ultrasonic beam in response to the out of range condition.

Example 23 may include the at least one computer readable storage medium of Example 22, wherein a plurality of the transmitter sub arrays have a light detector and a corresponding ultrasonic receiver and the instructions, if executed, cause the contactless charger to use the transmitter sub arrays to send a known wave pulse to the adjacent ultrasonic receiver, receive one or more signals from the light detectors, and receive one or more signals from the corresponding ultrasonic receivers, wherein the out of range condition is detected based on the one or more signals from the light detectors and the one or more signals from the corresponding ultrasonic receivers.

Example 24 may include the at least one computer readable storage medium of any one of Examples 18 to 23, wherein the charging surface further includes a light sensor and the instructions, if executed, cause the contactless charger to detect a charge light of the battery powered device, determine a charge level of the battery powered device based on a status of the charge light, and adjust a power of the ultrasonic beam based on the charge state of the battery powered device.

Example 25 may include a contactless charger comprising means for performing the method of any one of Examples 11 to 17.

Thus, techniques described herein may provide improve charging efficiency relative to capacitive solutions. Moreover, EMI concerns associated with inductive charging and safety concerns associated with conventional ultrasonic charging solutions may be obviated while providing charge rates that are comparable to wired charging capabilities. Additionally, techniques may enable carefree positioning and universal charging of multiple devices. As a result, platforms may be more user friendly with an enhanced overall user experience in terms of simplified docking and charging.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) evolve over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A contactless charger comprising:
a charging surface including an array of transmitter sub arrays, each transmitter sub array having a plurality of ultrasonic transmitters; and
logic to:
detect a location of an adjacent ultrasonic receiver of a battery powered device relative to the charging surface based on a differential in a ultrasonic beam reflection energy with respect to planar a beam reflector positioned at a perimeter of the adjacent ultrasonic receiver, the planar beam reflector to direct the ultrasonic beam energy away from the adjacent ultrasonic receiver;
determine a three-dimensional characteristic of a movement of the adjacent ultrasonic receiver based on the differential; and
selectively activate one or more of the transmitter sub arrays based on the location to focus an ultrasonic beam on the adjacent ultrasonic receiver.

2. The contactless charger of claim 1, wherein the logic is to:
detect the movement of the adjacent ultrasonic receiver, and
adjust the focus of the ultrasonic beam in response to the movement.

3. The contactless charger of claim 2, wherein a plurality of the transmitter sub arrays have a corresponding ultrasonic receiver and the logic is to:
receive one or more signals from the corresponding ultrasonic receivers, and
use the one or more signals from the corresponding ultrasonic receivers to identify the differential in beam reflection energy with respect to the beam reflector positioned at a perimeter of the adjacent ultrasonic receiver.

4. The contactless charger of claim 2, wherein a plurality of the transmitter sub arrays have a light detector and an ultrasonic ranger, and the logic is to:
receive one or more signals from the light detectors,
receive one or more signals from the ultrasonic rangers, and
determine the three-dimensional characteristic of the movement based on the one or more signals from the light detectors and the one or more signals from the ultrasonic rangers.

5. The contactless charger of claim 2, wherein the logic is to:
detect an out of range condition associated with the movement, and
discontinue the ultrasonic beam in response to the out of range condition.

6. The contactless charger of claim 5, wherein a plurality of the transmitter sub arrays have a light detector and a corresponding ultrasonic receiver and the logic is to:
use the transmitter sub arrays to send a known wave pulse to the adjacent ultrasonic receiver,
receive one or more signals from the light detectors, and
receive one or more signals from the corresponding ultrasonic receivers, wherein the out of range condition is detected based on the one or more signals from the light detectors and the one or more signals from the corresponding ultrasonic receivers.

7. The contactless charger of claim 1, wherein the charging surface further includes a light sensor, the logic to:
detect a charge light of the battery powered device,
determine a charge level of the battery powered device based on a status of the charge light, and
adjust a power of the ultrasonic beam based on the charge state of the battery powered device.

8. A method of operating a contactless charger, comprising:
detecting a location of an adjacent ultrasonic receiver of a battery powered device relative to a charging surface of the contactless charger based on a differential in a ultrasonic beam reflection energy with respect to planar a beam reflector positioned at a perimeter of the adjacent ultrasonic receiver the planar beam reflector to direct the ultrasonic beam energy away from the adjacent ultrasonic receiver, the charging surface including an ultrasonic array of transmitter sub arrays;
determining a three-dimensional characteristic of a movement of the adjacent ultrasonic receiver based on the differential; and selectively activating one or more of the transmitter sub arrays based on the location to focus an ultrasonic beam on the adjacent ultrasonic receiver.

9. The method of claim 8, further including:
detecting the movement of the adjacent ultrasonic receiver; and
adjusting the focus of the ultrasonic beam in response to the movement.

10. The method of claim 9, wherein a plurality of the transmitter sub arrays have a corresponding ultrasonic receiver and the method further includes:
receiving one or more signals from the corresponding ultrasonic receivers; and
using the one or more signals from the corresponding ultrasonic receivers to identify the differential in beam reflection energy with respect to the beam reflector positioned at the perimeter of the adjacent ultrasonic receiver.

11. The method of claim 9, wherein a plurality of the transmitter sub arrays have a light detector and an ultrasonic ranger, and the method further includes:
receiving one or more signals from the light detectors;
receiving one or more signals from the ultrasonic rangers; and
determining a three-dimensional characteristic of the movement based on the one or more signals from the light detectors and the one or more signals from the ultrasonic rangers.

12. The method of claim 9, further including:
detecting an out of range condition associated with the movement; and
discontinuing the ultrasonic beam in response to the out of range condition.

13. The method of claim 12, wherein a plurality of the transmitter sub arrays have a light detector and a corresponding ultrasonic receiver and the method further includes:
using the transmitter sub arrays to send a known wave pulse to the adjacent ultrasonic receiver;
receiving one or more signals from the light detectors; and
receiving one or more signals from the corresponding ultrasonic receivers, wherein the out of range condition is detected based on the one or more signals from the light detectors and the one or more signals from the corresponding ultrasonic receivers.

14. The method of claim 8, wherein the charging surface further includes a light sensor, the method further including:
detecting a charge light of the battery powered device;
determining a charge level of the battery powered device based on a status of the charge light; and
adjusting a power of the ultrasonic beam based on the charge state of the battery powered device.

15. At least one computer readable storage medium comprising a set of non-transitory computer-executable instructions which, if executed by a contactless charger, cause the contactless charger to:
detect a location of an adjacent ultrasonic receiver of a battery powered device relative to a charging surface of the contactless charger based on a differential in a ultrasonic beam reflection energy with respect to planar a beam reflector positioned at a perimeter of the adjacent ultrasonic receiver the planar beam reflector to direct the ultrasonic beam energy away from the adjacent ultrasonic receiver, the charging surface to include an ultrasonic array of transmitter sub arrays;
determine a three-dimensional characteristic of a movement of the adjacent ultrasonic receiver based on the differential; and
selectively activate one or more of the transmitter sub arrays based on the location to focus an ultrasonic beam on the adjacent ultrasonic receiver.

16. The at least one computer readable storage medium of claim 15, wherein the instructions, if executed, cause the contactless charger to:
detect the movement of the adjacent ultrasonic receiver; and
adjust the focus of the ultrasonic beam in response to the movement.

17. The at least one computer readable storage medium of claim 16, wherein a plurality of the transmitter sub arrays have a corresponding ultrasonic receiver and the instructions, if executed, cause the contactless charger to:
receive one or more signals from the corresponding ultrasonic receivers; and
use the one or more signals from the corresponding ultrasonic receivers to identify the differential in beam reflection energy with respect to the beam reflector positioned at the perimeter of the adjacent ultrasonic receiver.

18. The at least one computer readable storage medium of claim 16, wherein a plurality of the transmitter sub arrays have a light detector and an ultrasonic ranger, and the instructions, if executed, cause the contactless charger to:
receive one or more signals from the light detectors;
receive one or more signals from the ultrasonic rangers; and
determine a three-dimensional characteristic of the movement based on the one or more signals from the light detectors and the one or more signals from the ultrasonic rangers.

19. The at least one computer readable storage medium of claim 16, wherein the instructions, if executed, cause the contactless charger to:
detect an out of range condition associated with the movement; and
discontinue the ultrasonic beam in response to the out of range condition.

20. The at least one computer readable storage medium of claim 19, wherein a plurality of the transmitter sub arrays have a light detector and a corresponding ultrasonic receiver and the instructions, if executed, cause the contactless charger to:
use the transmitter sub arrays to send a known wave pulse to the adjacent ultrasonic receiver;
receive one or more signals from the light detectors; and
receive one or more signals from the corresponding ultrasonic receivers, wherein the out of range condition is detected based on the one or more signals from the light detectors and the one or more signals from the corresponding ultrasonic receivers.

21. The at least one computer readable storage medium of claim 15, wherein the charging surface further includes a light sensor and the instructions, if executed, cause the contactless charger to:
detect a charge light of the battery powered device;
determine a charge level of the battery powered device based on a status of the charge light; and
adjust a power of the ultrasonic beam based on the charge state of the battery powered device.

* * * * *